H. LUSSIER.
FILLING SEVERING DEVICE FOR LOOMS.
APPLICATION FILED JULY 15, 1911.
1,012,875.
Patented Dec. 26, 1911.
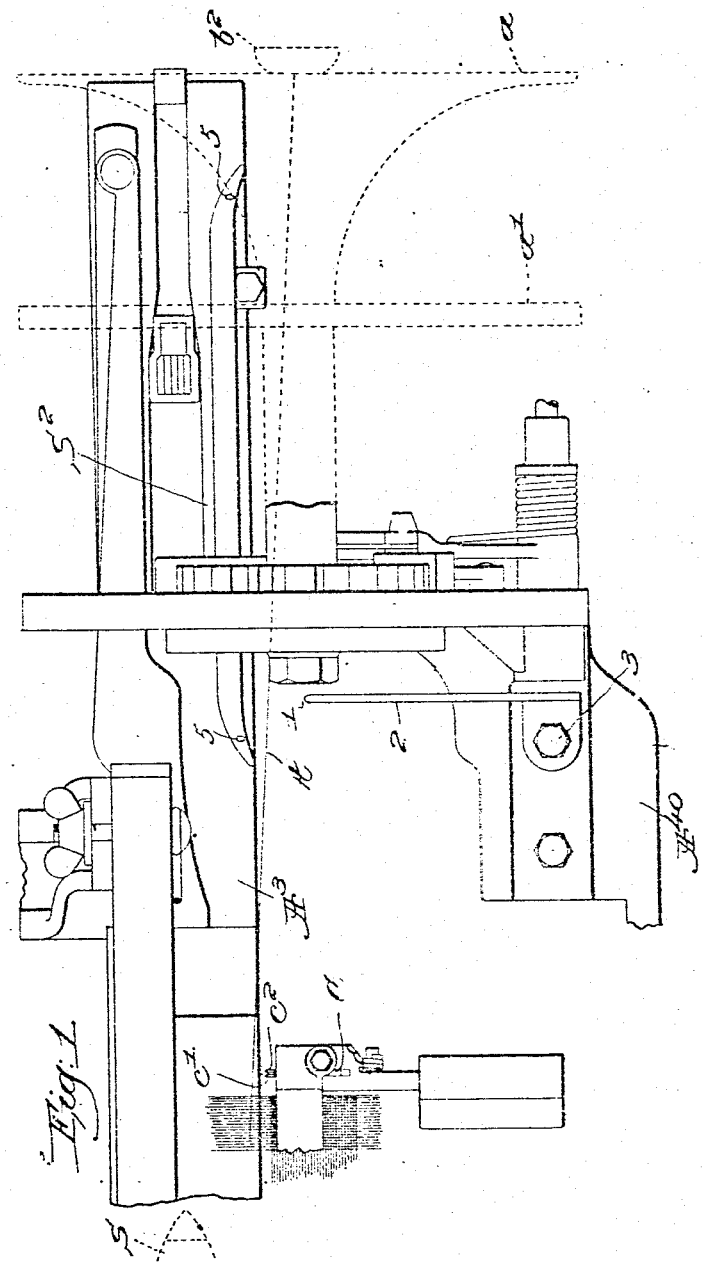
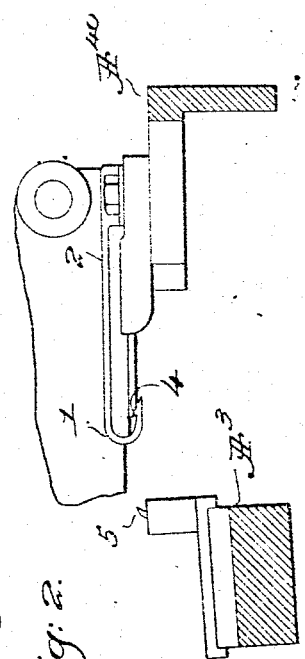

UNITED STATES PATENT OFFICE.

HENRY LUSSIER, OF SALEM, MASSACHUSETTS, ASSIGNOR TO DRAPER COMPANY, OF HOPEDALE, MASSACHUSETTS, A CORPORATION OF MAINE.

FILLING-SEVERING DEVICE FOR LOOMS.

1,012,875.     Specification of Letters Patent.     Patented Dec. 26, 1911.

Application filed July 15, 1911. Serial No. 638,675.

*To all whom it may concern:*

Be it known that I, HENRY LUSSIER, a citizen of the United States, and resident of Salem, county of Essex, State of Massachusetts, have invented an Improvement in Filling-Severing Devices for Looms, of which the following description, in connection with the accompanying drawing, is a specification, like characters on the drawing representing like parts.

This invention relates particularly to looms provided with automatic filling supplying mechanism, and has for its object the production of means for insuring the cutting of the weft or filling thread at a predetermined point close to the selvage and between it and the point of attachment of the end of the filling. Such filling severing means of various types are well known in the art and for a familiar form reference may be made to the patent to Stimpson No. 765,687, granted July 26, 1904. In looms provided with such filling severing devices it is important that the filling end should be severed as soon as possible, and the object of this invention is to place the filling end at once in the field of operation of the severing device so as to insure the filling being severed promptly. To this end means are provided on the loom frame for catching the filling end and keeping it in the field of operation of the severing device, and means are mounted on the lay to engage the filling and carry it on the forward beat of the lay into engagement with the filling catching means.

The nature of the invention will more fully appear from the accompanying description and drawings and will be particularly pointed out in the claims.

The drawings illustrate only so much of an automatic filling replenishing loom as is necessary to an understanding of the present invention.

In the drawings, Figure 1 is a plan view showing a portion of the loom frame, lay, filling feeder and filling severing means sufficient to illustrate in connection therewith the present invention; Fig. 2 is a transverse cross section of the construction shown in Fig. 1.

The loom frame, breast-beam $A^{40}$, supplying mechanism including the feeder $a$, $a'$ to receive the filling carriers, the weft or filling end holder $b^2$, the lay $A^3$, the shuttle-box $S^2$, the shuttle $S$, the temple T and their associated parts are all familiar and well known in automatic filling replenishing looms of this type, and need not be described in detail, not being specifically involved in this invention.

The filling severing means is mounted in a fixed position adjacent the fell and selvage, and as shown in the aforesaid patent to Stimpson is commonly mounted on the temple. In the drawings the cutting blade is shown at C with its projecting ends $c'$ and $c^2$. When the filling is beneath the ends $c'$ and $c^2$ it is within the field of operation of the severing means and will be severed thereby.

When a fresh filling carrier has been inserted in the shuttle by the operation of the automatic filling changing mechanism, and the shuttle thrown across the lay $A^3$, the end of the filling $t$ will lead from the selvage of the cloth to the filling end holder $b^2$ as shown in Fig. 1, and as the lay beats forward toward the breast-beam this filling end is intended to be caught and severed by the severing means, but owing to variation in the character of fabric woven, the force required to beat the filling into the fell, the extent of the "bump of the cloth", the position of the temple and other causes, the severing means frequently fails to sever the filling promptly.

This invention provides a filling catching device herein shown as a hook 1 mounted upon the loom frame, by which term is meant any fixed part of the loom. In the construction illustrated the shank 2 of the hook is bolted at 3 to the breast beam $A^{40}$ and the point of the hook which therefore points in the direction of the breast-beam is barbed at 4 to catch and retain the filling. The hook is mounted adjacent the filling feeder and has its thread retaining end forward of the severing device, that is nearer the breast-beam as the lay moves forward. There is also provided means on the lay for engaging the filling end and carrying it upon the forward beat of the lay into engagement with this filling catching device or hook. This means comprises a vertical projection and preferably two such vertical projections mounted on the shuttle-box and shown at 5. One of these projections is adjacent the path of the hook 2 on the side toward the temple and the other is located upon the opposite side. It will thus be seen that with the filling end lying in the position illustrated in Fig. 1 when the lay beats forward the projections 5 would engage the filling, carry it forward over the barb 4 and into the hook, thus holding the filling extended from the hook to the fell, and consequently in the field of operation of the severing device so that it is sure of being severed as promptly as possible.

Having fully described my invention, what I claim as new and desire to secure by Letters Patent is:

1. In a loom provided with automatic filling supplying mechanism, the lay, a severing device for the end of a fresh supply of filling mounted in fixed position adjacent the selvage, a filling catching device mounted on the loom frame with its thread retaining end forward of the severing device whereby a filling end held in the fell and by said filling catching device will be kept in the field of operation of said severing device, and means carried by the lay for engaging the filling and carrying it on the forward beat of the lay into engagement with said filling catching device.

2. In a loom provided with automatic filling supplying mechanism, the lay, the temple, a severing device for the end of a fresh supply of filling mounted on the temple, a hook having its shank mounted on the loom frame with its thread retaining end forward of the severing device whereby a filling end held in the fell and by said hook will be kept in the field of operation of said severing device, means carried by the lay for engaging the filling and carrying it on the forward beat of the lay into engagement with said hook.

3. In a loom provided with automatic filling supplying mechanism, the lay, the temple, a severing device for the end of a fresh supply of filling mounted on the temple, a hook having its shank mounted on the loom frame with its thread retaining end forward of the severing device whereby a filling end held in the fell and by said hook will be kept in the field of operation of said severing device, a vertical projection on the shuttle box adjacent the path of the hook for engaging the filling and carrying it on the forward beat of the lay into engagement with said hook.

4. In a loom provided with automatic filling supplying mechanism, the lay, the temple, a severing device for the end of a fresh supply of filling mounted on the temple, a hook having its shank mounted on the loom frame with its thread retaining end forward of the severing device whereby a filling end held in the fell and by said hook will be kept in the field of operation of said severing device, vertical projections on the shuttle-box at each side of the path of the hook for engaging the filling and carrying it on the forward beat of the lay into engagement with said hook.

5. In a loom provided with automatic filling supplying mechanism, the lay, a severing device for the end of a fresh supply of filling mounted in fixed position adjacent the selvage, a filling catching device mounted on the loom frame with its thread retaining end forward of the severing device, whereby a filling end held in the fell and by said filling catching device will be kept in the field of operation of said severing device, and vertical projections on the shuttle-box at each side of the path of said filling catching device for engaging the filling and carrying it on the forward beat of the lay into engagement with said filling catching device.

In testimony whereof, I have signed my name to this specification in the presence of two subscribing witnesses.

HENRY LUSSIER.

Witnesses:
MICHEL PHARRENT,
JAMES J. TIERNEY.